US012586557B2

(12) United States Patent
Wang et al.

(10) Patent No.: US 12,586,557 B2
(45) Date of Patent: Mar. 24, 2026

(54) ACTIVE NOISE REDUCTION SYSTEM

(71) Applicant: HONDA MOTOR CO., LTD., Tokyo (JP)

(72) Inventors: Xun Wang, Saitama (JP); Toshio Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 18/768,157

(22) Filed: Jul. 10, 2024

(65) Prior Publication Data

US 2025/0022454 A1 Jan. 16, 2025

(30) Foreign Application Priority Data

Jul. 14, 2023 (JP) ................................ 2023-116228

(51) Int. Cl.
*G10K 11/178* (2006.01)

(52) U.S. Cl.
CPC .................. *G10K 11/17854* (2018.01); *G10K 11/17823* (2018.01); *G10K 11/17825* (2018.01)

(58) Field of Classification Search
CPC ....... G10K 11/17854; G10K 11/17823; G10K 11/17825; G10K 2210/1081; G10K 11/17817; G10K 11/17833; G10K 11/17855; G10K 11/17881; G10K 11/17883; G10K 11/1785
USPC ......................... 381/71.1, 71.4, 71.11, 71.14
See application file for complete search history.

(56) References Cited

U.S. PATENT DOCUMENTS

| | | | | |
|---|---|---|---|---|
| 5,689,572 A * | 11/1997 | Ohki | G10K 11/17881 381/94.1 |
| 10,163,432 B2 * | 12/2018 | Every | G10K 11/178 |
| 11,315,542 B2 * | 4/2022 | Wang | G10K 11/17883 |
| 12,236,933 B2 * | 2/2025 | Wang | G10K 11/17853 |
| 2010/0014685 A1 * | 1/2010 | Wurm | G10K 11/17823 381/71.11 |
| 2018/0240452 A1 * | 8/2018 | Every | G10K 11/178 |
| 2025/0029592 A1 * | 1/2025 | Wang | G10K 11/17833 |
| 2025/0078803 A1 * | 3/2025 | Wang | G10K 11/17881 |

FOREIGN PATENT DOCUMENTS

JP H08221079 A 8/1996

* cited by examiner

*Primary Examiner* — Xu Mei
(74) *Attorney, Agent, or Firm* — Armstrong Teasdale LLP

(57) ABSTRACT

An active noise reduction system of an IMC type includes a canceling sound output device, an error microphone, and a controller. The error microphone is configured to generate an error signal. The controller includes a control filter and a secondary path filter. The secondary path filter is configured to generate a canceling sound estimation signal. The control filter is configured to generate a control signal based on a reference signal generated based on both the error signal and the canceling sound estimation signal. The controller further includes a primary path filter configured to generate a noise estimation signal based on the reference signal. The secondary path filter and the primary path filter are configured to be adaptively updated based on a virtual error signal generated based on both the reference signal and the noise estimation signal.

9 Claims, 7 Drawing Sheets

ACTIVE NOISE REDUCTION SYSTEM

TECHNICAL FIELD

The present invention relates to an active noise reduction system that reduces a noise by causing a canceling sound that is in an opposite phase to the noise to interfere with the noise.

BACKGROUND ART

In recent years, taking into account people in vulnerable situations such as the elderly and children among traffic participants, efforts have been actively made to provide access to sustainable transportation systems for such people. Toward its realization, research and development for further improving the safety and convenience of traffic through development of vehicle comfort are attracting attention.

To improve vehicle comfort, it is desirable to reduce the noise inside a vehicle. As such, research and development of an active noise reduction system, which reduces the noise by causing a canceling sound that is in an opposite phase to the noise to interfere with the noise, are actively conducted.

Conventionally, an active noise reduction system of an internal model control type (IMC type) is known as an active noise reduction system of a feedback control type. The active noise reduction system of an IMC type is configured to generate a reference signal inside a controller based on an error signal generated by an error microphone and a canceling sound estimation signal generated by a secondary path filter.

For example, JPH8-221079A discloses an active noise reduction system of an IMC type configured to generate a white noise by a white noise generation unit and adaptively update a secondary path filter (see "ADF 25" of JPH8-221079A) based on the white noise and an error signal.

In JPH8-221079A, the white noise for the adaptive update of the secondary path filter is output from a canceling sound output device (see "speaker 4" in JPH8-221079A) together with a canceling sound. Accordingly, the white noise may be heard by an occupant in a vehicle cabin, which may discomfort the occupant. On the other hand, if the white noise is reduced such that the occupant in the vehicle cabin does not hear the white noise, the adaptive update of the secondary path filter may not be performed accurately.

SUMMARY OF THE INVENTION

In view of the above background, an object of the present invention is to provide an active noise reduction system of an IMC type that can accurately perform the adaptive update of the secondary path filter without discomforting an occupant by adding a noise such as a white noise. Further, another object of the present invention is to contribute to the development of sustainable transportation systems.

To achieve such an object, one aspect of the present invention provides an active noise reduction system (1 and 71) of an IMC type comprising: a canceling sound output device (21) configured to output a canceling sound for canceling a noise; an error microphone (22) configured to generate an error signal (e) based on the noise and the canceling sound; and a controller (23 and 73) configured to control the canceling sound output device based on the error signal, wherein the controller includes: a control filter (W) configured to generate a control signal (u) for controlling the canceling sound output device; and a secondary path filter ($\hat{C}$) that represents an estimation value of a transfer function from the canceling sound output device to the error microphone, the secondary path filter is configured to generate a canceling sound estimation signal ($\hat{y}$) based on the control signal, the control filter is configured to generate the control signal based on a reference signal (r) generated based on both the error signal and the canceling sound estimation signal, the controller further includes a primary path filter ($\hat{P}$) that represents an estimation value of a transfer function from a noise source to the error microphone, the primary path filter is configured to generate a noise estimation signal ($\hat{d}$) based on the reference signal, and the secondary path filter and the primary path filter are configured to be adaptively updated based on a virtual error signal ($e_v$) generated based on both the reference signal and the noise estimation signal.

According to this aspect, it is possible to adaptively update the secondary path filter not using a noise such as a white noise but using the primary path filter. Accordingly, it is possible to accurately perform the adaptive update of the secondary path filter without discomforting an occupant by adding a noise such as a white noise.

In the above aspect, preferably, the controller is configured to normalize an adaptive update amount of the secondary path filter and an adaptive update amount of the primary path filter using a common normalization divisor.

Even if one of the secondary path filter or the primary path filter approaches convergence, the convergence thereof may be delayed due to the influence of the fluctuation of the other. According to the above aspect, the adaptive update amount of the secondary path filter and the adaptive update amount of the primary path filter are normalized using the common normalization divisor. Accordingly, it is possible to suppress the variation between the convergence speed of the secondary path filter and the convergence speed of the primary path filter. Accordingly, it is possible to prevent the convergence of one of the secondary path filter and the primary path filter from being delayed due to the fluctuation of the other, and to cause the secondary path filter and the primary path filter to converge quickly.

In the above aspect, preferably, the secondary path filter is configured to be adaptively updated based on the control signal and the virtual error signal, the primary path filter is configured to be adaptively updated based on the reference signal and the virtual error signal, and the common normalization divisor includes a norm of a signal vector of the reference signal and a norm of a signal vector of the control signal.

While the initial value of the control signal is zero, the initial value of the reference signal has a certain magnitude (i.e., the initial value of the reference signal is not zero). Accordingly, if the adaptive update amount of the secondary path filter is normalized based on the control signal and the adaptive update amount of the primary path filter is normalized based on the reference signal, a large difference may be caused between the adaptive update amounts of these two filters in an early stage of convergence. According to the above aspect, both the adaptive update amount of the secondary path filter and the adaptive update amount of the primary path filter are normalized based on the reference signal and the control signal. Accordingly, it is possible to prevent a large difference from being caused between the adaptive update amounts of these two filters in an early stage of convergence. Accordingly, it is possible to cause the secondary path filter and the primary path filter to converge more quickly.

In the above aspect, preferably, the secondary path filter is composed of a finite impulse response filter, and the controller is configured to adjust an adaptive update amount of the secondary path filter using a weighting coefficient that corresponds to a characteristic of an impulse response of the secondary path filter.

According to this aspect, the weighting coefficient can increase as the amplitude of the impulse response of the secondary path filter (i.e., the coefficient of the secondary path filter) increases, and the weighting coefficient can decrease as the amplitude of the impulse response of the secondary path filter decreases. Accordingly, it is possible to cause the secondary path filter to converge quickly. Furthermore, the shape of the impulse response of the secondary path filter can be maintained in the secondary path filter after the adaptive update thereof. Accordingly, it is possible to improve the stability of the noise reduction control.

In the above aspect, preferably, the controller is configured to set the weighting coefficient such that the weighting coefficient is maximized at a delay time of the impulse response of the secondary path filter according to a distance from the canceling sound output device to the error microphone.

According to this aspect, it is possible to cause the secondary path filter to converge more quickly.

In the above aspect, preferably, the controller is configured to set the weighting coefficient such that the weighting coefficient becomes smaller as time elapses from the delay time.

According to this aspect, it is possible to cause the secondary path filter to converge much more quickly.

In the above aspect, preferably, the control filter is configured to be adaptively updated based on the error signal, and the controller is configured to adjust an adaptive update amount of the control filter using a weighting coefficient that decreases in a stepped shape after a prescribed time elapses from a time the canceling sound output device outputs the canceling sound.

According to this aspect, it is possible to adjust the adaptive update amount of the control filter—it is difficult to predict the shape of the impulse response thereof—using a weighting coefficient having a simple form.

In the above aspect, preferably, the controller further includes a band-pass filter (B) configured to generate an extraction error signal by extracting a component in a prescribed control target frequency band from the error signal, and the reference signal is configured to be generated based on the extraction error signal and the canceling sound estimation signal.

Normally, in an active noise reduction system of an IMC type, the noise can be reduced in a narrow frequency band. Accordingly, it is common to preferentially reduce the noise in a low frequency band that has a relatively large peak when reducing the noise in a vehicle cabin using an active noise reduction system of an IMC type. By contrast, when the hearing characteristic of a human being is taken into consideration, there is a case where it is desirable to preferentially reduce the noise in a high frequency band that is easily detected by the ear of the human being. According to the above aspect, it is possible to easily switch the frequency band in which the noise is preferentially reduced by switching the control target frequency band. Accordingly, it is possible to gain the optimal noise reduction effect according to various needs.

In the above aspect, preferably, the controller further includes: a noise generation unit (77) configured to generate a random noise; and a band-stop filter (BS) configured to generate a noise signal ($x_n$) by attenuating a component in the control target frequency band of the random noise, and the control filter is configured to be adaptively updated based on the extraction error signal and the noise signal.

According to this aspect, the control filter is adaptively updated based on the random noise in a frequency band other than the control target frequency band.

As a result, the controller reduces the coefficient of the control filter in the frequency band other than the control target frequency band. Accordingly, it is possible to suppress an increase in the noise.

Thus, according to the above aspects, it is possible to provide an active noise reduction system of an IMC type that can accurately perform the adaptive update of the secondary path filter without discomforting the occupant by adding a noise such as a white noise.

BRIEF DESCRIPTION OF THE DRAWING(S)

DETAILED DESCRIPTION OF THE INVENTION

Figure 1:
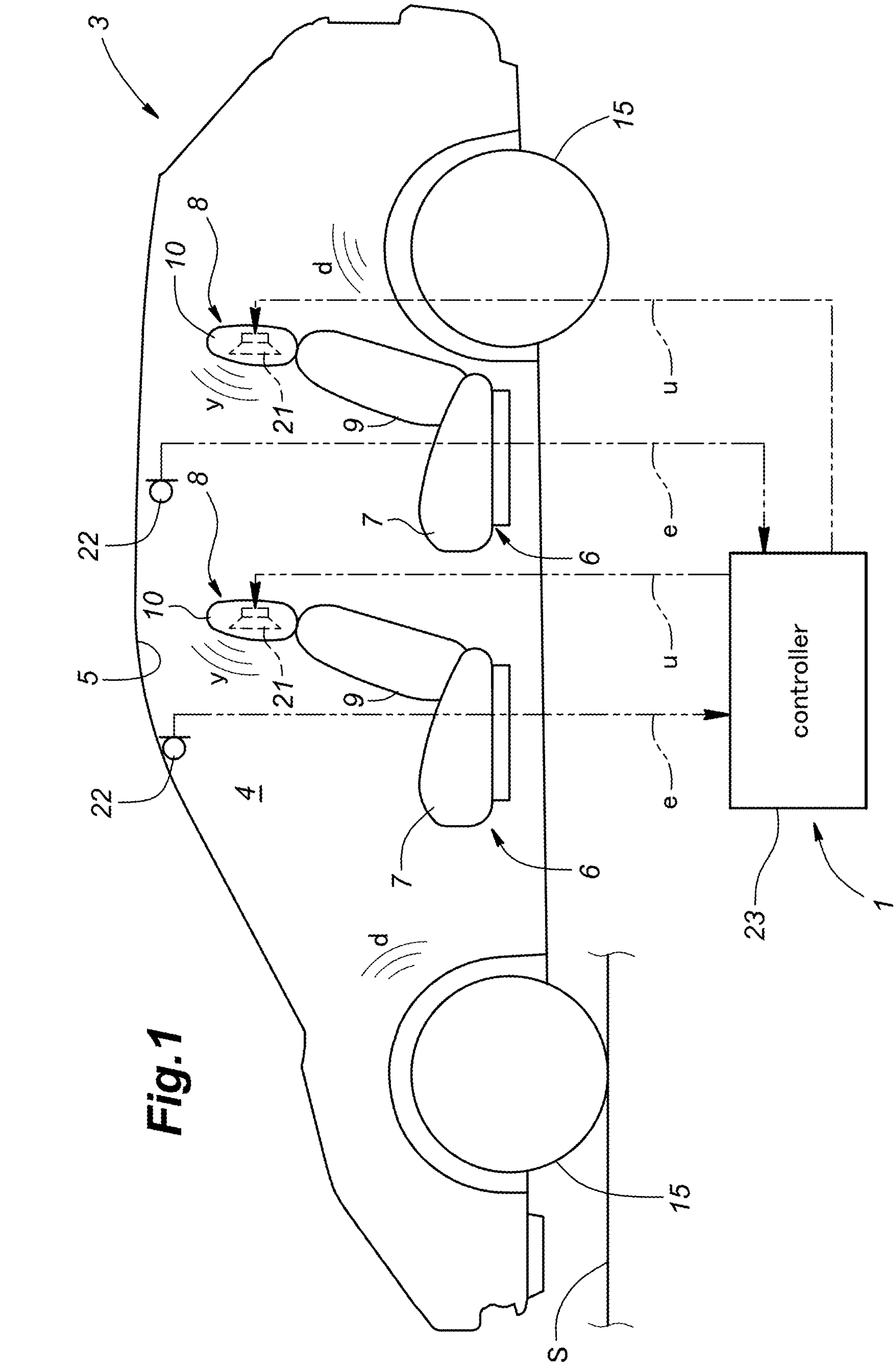
FIG. 1 is a schematic diagram showing a vehicle to which an active noise reduction system according to the first embodiment is applied.

In the following, embodiments of the present invention will be described with reference to the drawings. Note that in the following description, "^" (circumflex) added to various symbols indicates an identified value or an estimated value. "^" is added above each symbol in the drawings, but is added after each symbol in the description.

The First Embodiment

First, the first embodiment of the present invention will be described with reference to FIGS. 1 to 4.

<Vehicle 3>

FIG. 1 is a schematic diagram showing a vehicle 3 to which an active noise reduction system 1 (hereinafter referred to as "the noise reduction system 1") according to the first embodiment is applied. The vehicle 3 is, for example, a four-wheeled automobile.

Inside a vehicle cabin 4 of the vehicle 3, a plurality of occupant seats 6 is arranged below a roof lining 5. Each occupant seat 6 (hereinafter simply referred to as "the occupant seat 6") includes a seat cushion 7 and a reclining portion 8 arranged above and behind the seat cushion 7 and configured to rotate relative to the seat cushion 7. The reclining portion 8 includes a seat back 9 and a headrest 10 fixed to an upper end of the seat back 9.

<Noise Reduction System 1>

The noise reduction system 1 is an Active Noise Control device (ANC device) configured to reduce a noise d generated inside the vehicle cabin 4 of the vehicle 3. More specifically, the noise reduction system 1 reduces the noise d by generating a canceling sound y that is in an opposite phase to the noise d and causing the generated canceling sound y to interfere with the noise d.

For example, the noise d to be reduced by the noise reduction system 1 is a road noise caused by the vibrations of wheels 15 due to the force from a road surface S. The noise d to be reduced by the noise reduction system 1 may be a noise (for example, a drive noise caused by the vibrations of a drive source such as an internal combustion engine and an electric motor) other than the above-mentioned road noise.

Figure 2:
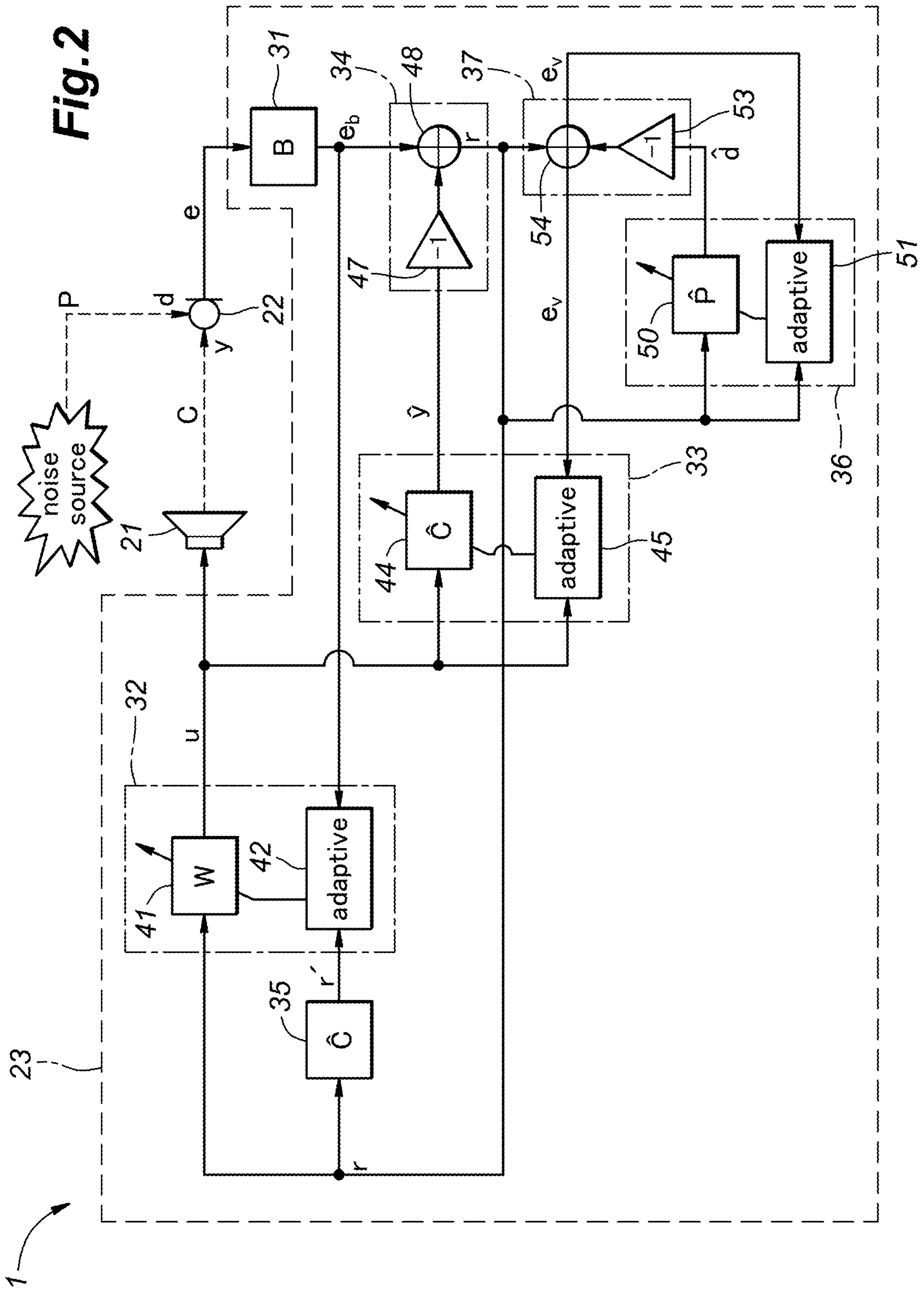
FIG. 2 is a functional block diagram showing the active noise reduction system according to the first embodiment.

With reference to FIGS. 1 and 2, the noise reduction system 1 includes a plurality of speakers 21 (an example of a canceling sound output device) each configured to output the canceling sound y for canceling the noise d, a plurality of error microphones 22 each configured to generate an error signal e based on the noise d and the canceling sound y, and a controller 23 configured to control the plurality of speakers 21 based on the error signal e.

<Speaker 21>

With reference to FIG. 1, each speaker 21 (hereinafter simply referred to as "the speaker 21") is installed in the headrest 10 of the reclining portion 8 of the occupant seat 6. In another embodiment, the speaker 21 may be installed in a portion (for example, the seat back 9) other than the headrest 10 of the reclining portion 8 of the occupant seat 6, or in a portion other than the reclining portion 8 of the occupant seat 6. In still another embodiment, the speaker 21 may be installed in a portion of the vehicle 3 other than the occupant seat 6.

<Error Microphone 22>

Each error microphone 22 (hereinafter, simply referred to as "the error microphone 22") is installed in a portion of the vehicle 3 other than the occupant seat 6. The error microphone 22 is installed, for example, in the roof lining 5. In another embodiment, the error microphone 22 may be installed in a B-pillar (not shown) and the like, or in the occupant seat 6.

<Controller 23>

The controller 23 is composed of a computer including an arithmetic processing unit (a processor such as a CPU, an MPU, etc.) and a storage device (a memory such as a ROM, a RAM, etc.). The controller 23 may be configured as one piece of hardware or may be configured as a unit including multiple pieces of hardware.

With reference to FIG. 2, the controller 23 includes, as functional components, an extraction error signal generation unit 31, a control signal generation unit 32, a canceling sound estimation signal generation unit 33, a reference signal generation unit 34, a reference signal correction unit 35, a noise estimation signal generation unit 36, and a virtual error signal generation unit 37.

<Extraction Error Signal Generation Unit 31>

The extraction error signal generation unit 31 of the controller 23 includes a band-pass filter B. The band-pass filter B is a filter that extracts a component in a control target frequency band (a frequency band to be a control target of the controller 23) from an input signal. The control target frequency band can be switched at any time.

The error signal e from the error microphone 22 is input to the extraction error signal generation unit 31. As the band-pass filter B of the extraction error signal generation unit 31 extracts a component in the control target frequency band from the error signal e, the extraction error signal generation unit 31 generates an extraction error signal $e_b$. The extraction error signal generation unit 31 outputs the generated extraction error signal $e_b$ to the control signal generation unit 32 and the reference signal generation unit 34.

<Control Signal Generation Unit 32>

The control signal generation unit 32 of the controller 23 includes a control filter unit 41 and a control update unit 42.

The control filter unit 41 includes a control filter W. The control filter W is composed of, for example, a finite impulse response filter (FIR filter). In another embodiment, the control filter W may be composed of a single-frequency adaptive notch filter (SAN filter) and the like.

As the control filter W of the control filter unit 41 filters a reference signal r (which will be described later), the control filter unit 41 generates a control signal u for controlling the speaker 21. The control filter unit 41 outputs the generated control signal u to the speaker 21 and the canceling sound estimation signal generation unit 33. Accordingly, the speaker 21 generates the canceling sound y according to the control signal u output from the control filter unit 41.

The control update unit 42 adaptively updates the control filter W using an adaptive algorithm such as a least mean square algorithm (LMS algorithm). More specifically, the control update unit 42 updates the control filter W such that the extraction error signal $e_b$ output from the extraction error signal generation unit 31 is minimized.

<Canceling Sound Estimation Signal Generation Unit 33>

The canceling sound estimation signal generation unit 33 of the controller 23 includes a secondary path filter unit 44 and a secondary path update unit 45.

The secondary path filter unit 44 includes a secondary path filter $\hat{C}$. The secondary path filter $\hat{C}$ is a filter that represents an estimation value of a transfer function C of a secondary path from the speaker 21 to the error microphone 22. The secondary path filter $\hat{C}$ is composed of, for example, an FIR filter. In another embodiment, the secondary path filter $\hat{C}$ may be composed of a SAN filter and the like.

As the secondary path filter $\hat{C}$ of the secondary path filter unit 44 filters the control signal u, the secondary path filter unit 44 generates a canceling sound estimation signal $\hat{y}$ that represents an estimation value of the canceling sound y. The secondary path filter unit 44 outputs the generated canceling sound estimation signal $\hat{y}$ to the reference signal generation unit 34.

The secondary path update unit 45 adaptively updates the secondary path filter $\hat{C}$ using an adaptive algorithm such as the LMS algorithm. More specifically, the secondary path update unit 45 adaptively updates the secondary path filter $\hat{C}$ such that a virtual error signal $e_v$ (which will be described later) output from the virtual error signal generation unit 37 is minimized.

<Reference Signal Generation Unit 34>

The reference signal generation unit 34 of the controller 23 includes a first polarity reversing unit 47 and a first adder 48.

The first polarity reversing unit 47 reverses the polarity of the canceling sound estimation signal $\hat{y}$ output from the canceling sound estimation signal generation unit 33.

The first adder 48 generates the reference signal r that represents an estimation value of the noise d by adding the extraction error signal $e_b$ output from the extraction error signal generation unit 31 and the canceling sound estimation signal $\hat{y}$ that has passed through the first polarity reversing unit 47. The first adder 48 outputs the generated reference signal r to the control signal generation unit 32, the reference signal correction unit 35, the noise estimation signal generation unit 36, and the virtual error signal generation unit 37.

<Reference Signal Correction Unit 35>

The reference signal correction unit 35 of the controller 23 includes the secondary path filter C^, similar to the secondary path filter unit 44 of the canceling sound estimation signal generation unit 33. When the secondary path filter C^ is updated in the canceling sound estimation signal generation unit 33, the updated secondary path filter C^ is output to the reference signal correction unit 35, and the secondary path filter C^ is updated in the reference signal correction unit 35. That is, the secondary path filter C^ set in the reference signal correction unit 35 is not a fixed value, but a value updated at any time based on the signal from the canceling sound estimation signal generation unit 33.

As the secondary path filter C^ of the reference signal correction unit 35 corrects the reference signal r, the reference signal correction unit 35 generates a correction reference signal r'. The reference signal correction unit 35 outputs the generated correction reference signal r' to the control signal generation unit 32.

<Noise Estimation Signal Generation Unit 36>

The noise estimation signal generation unit 36 of the controller 23 includes a primary path filter unit 50 and a primary path update unit 51.

The primary path filter unit 50 includes a primary path filter P^. The primary path filter P^ is a filter that represents an estimation value of a transfer function P of the primary path from a noise source to the error microphone 22. The primary path filter P^ is composed of, for example, an FIR filter. In another embodiment, the primary path filter P^ may be composed of a SAN filter and the like.

As the primary path filter P^ of the primary path filter unit 50 filters the reference signal r, the primary path filter unit 50 generates a noise estimation signal d^ that represents an estimation value of the noise d (more specifically, a component of the noise d that reaches the error microphone 22). The primary path filter unit 50 outputs the generated noise estimation signal d^ to the virtual error signal generation unit 37.

The primary path update unit 51 adaptively updates the primary path filter P^ using an adaptive algorithm such as the LMS algorithm. More specifically, the primary path update unit 51 adaptively updates the primary path filter P^ such that the virtual error signal $e_v$ output from the virtual error signal generation unit 37 is minimized.

<Virtual Error Signal Generation Unit 37>

The virtual error signal generation unit 37 of the controller 23 includes a second polarity reversing unit 53 and a second adder 54.

The second polarity reversing unit 53 reverses the polarity of the noise estimation signal d^ output from the noise estimation signal generation unit 36.

The second adder 54 generates the virtual error signal $e_v$ by adding the reference signal r output from the reference signal generation unit 34 and the noise estimation signal d^ that has passed through the second polarity reversing unit 53. The virtual error signal $e_v$ is a signal for learning the sound field (the transfer function C of the secondary path and the transfer function P of the primary path) in the vehicle cabin 4. In other words, the virtual error signal $e_v$ is a signal for adaptively updating the secondary path filter C^ and the primary path filter P^. The second adder 54 outputs the generated virtual error signal $e_v$ to the canceling sound estimation signal generation unit 33 and the noise estimation signal generation unit 36.

<The Flow of Signal Processing by the Controller 23>

Figure 3:
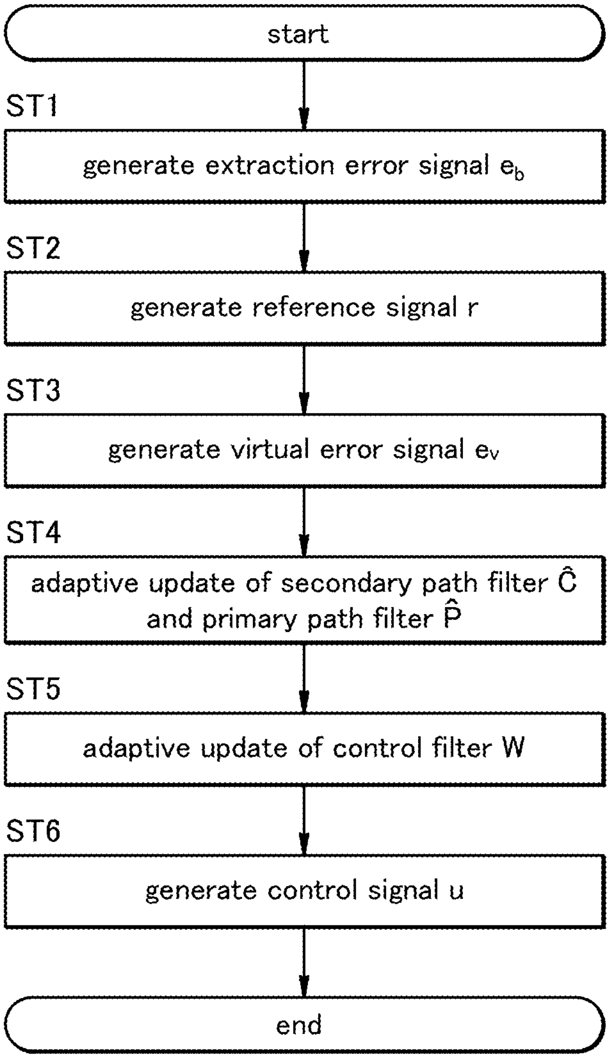
FIG. 3 is a flowchart showing the flow of signal processing by a controller according to the first embodiment.

With reference to FIGS. 2 and 3, when the error signal e from the error microphone 22 is input to the extraction error signal generation unit 31, the band-pass filter B of the extraction error signal generation unit 31 extracts the component in the control target frequency band from the error signal e. Accordingly, the extraction error signal generation unit 31 generates the extraction error signal $e_b$ (step ST1). The extraction error signal $e_b$ is represented by the following formula (1).

$$e_b(t) = e(t) * B \tag{1}$$

Next, the reference signal generation unit 34 generates the reference signal r based on the extraction error signal $e_b$ output from the extraction error signal generation unit 31 and the canceling sound estimation signal y^ output from the canceling sound estimation signal generation unit 33 (step ST2). The reference signal r is represented by the following formula (2).

$$r(t) = e_b(t) - \hat{y}(t) = e_b(t) - u(t) * \hat{C}(t) \tag{2}$$

Next, the virtual error signal generation unit 37 generates the virtual error signal $e_v$ based on the reference signal r output from the reference signal generation unit 34 and the noise estimation signal d^ output from the noise estimation signal generation unit 36 (step ST3). The virtual error signal $e_v$ is represented by the following formula (3).

$$e_v(t) = r(t) - \hat{d}(t) = e_b(t) - u(t) * \hat{C}(t) - r(t) * \hat{P}(t) \tag{3}$$

Next, the canceling sound estimation signal generation unit 33 adaptively updates the secondary path filter C^ according to the following formula (4), and the noise estimation signal generation unit 36 adaptively updates the primary path filter P^ according to the following formula (5) (step ST4). In the following formula (4), "$\mu_1$" represents a first weighting coefficient (first step size parameter) for adjusting the adaptive update amount of the secondary path filter C^. In the following formula (5), "$\mu_2$" represents a second weighting coefficient (second step size parameter) for adjusting the adaptive update amount of the primary path filter P^. In the following formulae (4) and (5), "$N_1$" represents a first normalization divisor for normalizing the adaptive update amount of the secondary path filter C^ and the primary path filter P^.

$$\hat{C}(t+1) = \hat{C}(t) + \frac{\mu_1}{N_1} e_v(t) u(t) \tag{4}$$

$$\hat{P}(t+1) = \hat{P}(t) + \frac{\mu_2}{N_1} e_v(t) r(t) \tag{5}$$

As is clear from the above formulae (4) and (5), the adaptive update amount of the secondary path filter C^ and the adaptive update amount of the primary path filter P^ are normalized by a common first normalization divisor $N_1$. The first normalization divisor $N_1$ is represented by the following formula (6). In the following formula (6), "$\|r(t)\|$" represents a norm of a signal vector of the reference signal r, and "||u(t)||" represents a norm of a signal vector of the control signal u. Further, in the following formula (6), "σ" represents a constant (small positive number) for preventing the first normalization divisor $N_1$ from becoming zero.

$$N_1 = \|r(t)\| + \|u(t)\| + \sigma \tag{6}$$

"||r(t)||" and "||u(t)||" in the above formula (6) are represented by the following formulae (7) and (8), respectively. In the following formula (7), "L1" represents the number of data of the signal vector of the reference signal r. In the following formula (8), "L2" represents the number of data of the signal vector of the control signal u.

$$\|r(t)\| = \sum_{i=1}^{L1} r_i(t)^2 \tag{7}$$

$$\|u(t)\| = \sum_{i=1}^{L2} u_i(t)^2 \tag{8}$$

Next, the control signal generation unit 32 adaptively updates the control filter W according to the following formula (9) (step ST5). In the following formula (9), "$\mu_3$" represents a third weighting coefficient (third step size parameter) for adjusting the adaptive update amount of the control filter W. In the following formula (9), "$N_2$" represents a second normalization divisor for normalizing the adaptive update amount of the control filter W.

$$W(t+1) = W(t) - \frac{\mu_3}{N_2} e_b(t)\left(r(t) * \hat{C}(t)\right) \tag{9}$$

The second normalization divisor $N_2$ in the above formula (9) is represented by the following formula (10). In the following formula (10), "||r(t)*C^(t)||" represents a norm of a signal vector of "r(t)*C^(t)", and "σ" represents a constant (small positive number) for preventing the second normalization divisor $N_2$ from becoming zero. The definition of "||r(t)*C^(t)||" in the following formula (10) is similar to the definitions of "||r(t)||" and "||u(t)||" in the above formula (6).

$$N_2 = \left\|r(t) * \hat{C}(t)\right\| + \sigma \tag{10}$$

Next, the control signal generation unit 32 generates the control signal u according to the following formula (11) (step ST6).

$$u(t+1) = W(t) * r(t) \tag{11}$$

<The Adaptive Update of the Secondary Path Filter C^ and the Primary Path Filter P^>

The error signal e is a signal acquired by adding the canceling sound y and the noise d, and the canceling sound y is represented by the control signal u and the transfer function C of the secondary path. Accordingly, the error signal e is represented by the following formula (12).

$$e(t) = y(t) + d(t) = u(t) * C(t) + d(t) \tag{12}$$

From the above formulae (1), (3), and (12), the following formula (13) is acquired.

$$e_v(t) = \left(d(t) * B - r(t) * \hat{P}(t)\right) + \left(u(t) * C(t) * B - u(t) * \hat{C}(t)\right) \tag{13}$$

The second term on the right side of the above formula (13) represents an error in the adaptive update of the secondary path filter C^. The canceling sound estimation signal generation unit 33 adaptively updates the secondary path filter C^ such that the virtual error signal $e_v$ is minimized. When the virtual error signal $e_v$ is minimized, the second term on the right side of the above formula (13) approaches zero. Accordingly, the adaptive update value of the secondary path filter C^ converges to "the transfer function C of the secondary path×the characteristic of the band-pass filter B".

The first term on the right side of the above formula (13) represents an error in the adaptive update of the primary path filter P^. The adaptive update of the primary path filter P^ is performed for extracting the noise estimation signal d^ from the reference signal r and generating the virtual error signal $e_v$ using the extracted noise estimation signal d^. The noise estimation signal generation unit 36 adaptively updates the primary path filter P^ such that the virtual error signal $e_v$ is minimized. When the virtual error signal $e_v$ is minimized, the first term on the right side of the above formula (13) approaches zero. Accordingly, the adaptive update value of the primary path filter P^ converges to the characteristic of the band-pass filter B.

<The Characteristic of the Band-Pass Filter B>

Figure 4:
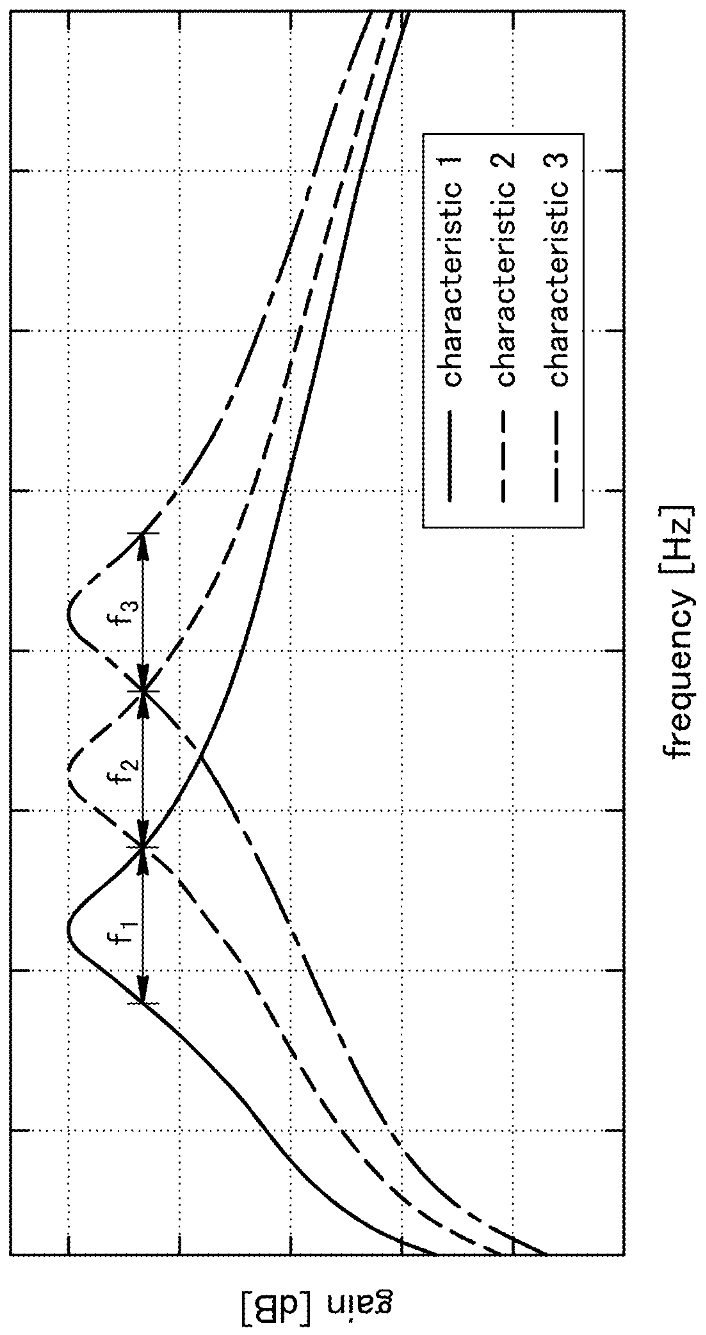
FIG. 4 is a graph showing the characteristic of a band-pass filter according to the first embodiment.

FIG. 4 shows the characteristic of the band-pass filter B. The characteristic of the band-pass filter B is switched according to the control target frequency band (the frequency band to be a control target of the controller 23).

For example, in a case where the control target frequency band is a first frequency band $f_1$, the characteristic of the band-pass filter B is set to a characteristic 1. Accordingly, it is possible to effectively reduce the noise d having a peak in the first frequency band $f_1$. In a case where the control target frequency band is a second frequency band $f_2$ that is higher than the first frequency band $f_1$, the characteristic of the band-pass filter B is set to a characteristic 2. Accordingly, it is possible to effectively reduce the noise d having a peak in the second frequency band $f_2$. In a case where the control target frequency band is a third frequency band $f_3$ that is higher than the second frequency band $f_2$, the characteristic of the band-pass filter B is set to a characteristic 3. Accordingly, it is possible to effectively reduce the noise d having a peak in the third frequency band $f_3$.

<Effects>

As described above, the primary path filter P^ generates the noise estimation signal d^ based on the reference signal r, and the secondary path filter C^ and the primary path filter P^ are adaptively updated based on the virtual error signal $e_v$ generated based on both the reference signal r and the noise estimation signal d^. According to such a configuration, it is possible to adaptively update the secondary path filter C^ not using a noise such as a white noise but using the primary path filter P^. Accordingly, it is possible to accurately perform the adaptive update of the secondary path filter C^ without discomforting the occupant by adding a noise such as a white noise.

Further, the secondary path filter C^ and the primary path filter P^ are adaptively updated. Accordingly, it is possible to prevent the occurrence of a difference between the sound field (the transfer function C of the secondary path and the transfer function P of the primary path) inside the vehicle cabin 4 and the secondary path filter C^ and the primary path filter P^ as the estimation values of the above sound field. Accordingly, it is possible to prevent the amplification of the noise d and the generation of an abnormal sound due to the above difference. Further, the secondary path filter C^ and the primary path filter P^ are adaptively updated such that these filters follow the change in the sound field inside the vehicle cabin 4. Accordingly, it is possible to stably reduce the peak of the noise d caused by the resonance inside the vehicle cabin 4.

Furthermore, the noise reduction system 1 is a noise reduction system of a feedback control type. More specifically, the noise reduction system 1 is a noise reduction system of an internal model control type (IMC type) that generates the reference signal r inside the controller 23. Accordingly, a reference microphone for generating the reference signal r based on the noise d and an acceleration sensor for generating the reference signal r based on vibrations are not required. Accordingly, it is possible to provide a reasonable noise reduction system 1.

<Modifications>

In the above first embodiment, only one band-pass filter B is provided. In another embodiment, a plurality of band-pass filters B having different characteristics may be provided in parallel, and a plurality of control filters W may be provided so as to correspond to the plurality of band-pass filters B, respectively. According to such a configuration, it is possible to simultaneously reduce the noise d having peaks in a plurality of frequency bands.

The Second Embodiment

Next, the second embodiment of the present invention will be described with reference to FIGS. 5 and 6. The configuration of the noise reduction system 1 is the same as that of the first embodiment, and therefore the descriptions thereof will be omitted.

<The Adaptive Update of the Secondary Path Filter C^>

Figure 5:
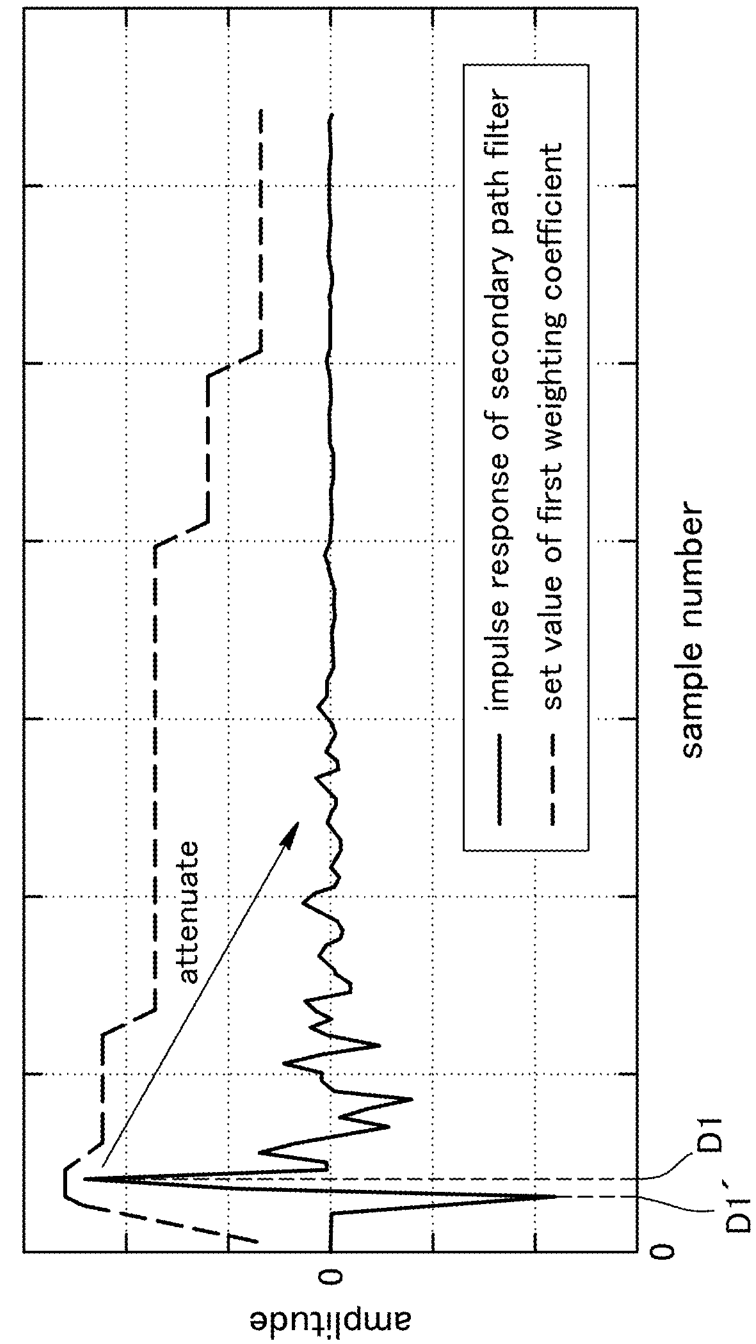
FIG. 5 is a graph showing the amplitude of an impulse response of a secondary path filter and a set value of a first weighting coefficient according to the second embodiment.

With reference to FIG. 5, as the speaker 21 outputs the canceling sound y at a sample number 0, the absolute value of the amplitude of the impulse response of the secondary path filter C^ (i.e., the coefficient of the secondary path filter C^) becomes maximum at a sample number D1. Thereafter, as the sample number increases from the sample number D1, the amplitude of the impulse response of the secondary path filter C^ attenuates.

The canceling sound estimation signal generation unit 33 calculates the sample number D1 using the following formula (14). In the following formula (14), "L" represents a distance (hereinafter referred to as "the propagation distance L") from the speaker 21 to the error microphone 22, "c" represents the speed (about 340 m/s) of the sound, "Te" represents the processing time of an electronic circuit that constitutes the controller 23, and "Fs" represents a sampling frequency. For example, the canceling sound estimation signal generation unit 33 calculates the propagation distance L based on the position of the occupant seat 6 or the secondary path filter C^. In the following formula (14), "c", "Te", and "Fs" are known values.

$$D1 = \left(\frac{L}{c} + Te\right) \times Fs \tag{14}$$

With reference to FIG. 5, the canceling sound estimation signal generation unit 33 sets a first weighting coefficient $\mu_1$ such that the first weighting coefficient $\mu_1$ is maximized at the sample number D1 (the sample number at which the absolute value of the amplitude of the impulse response of the secondary path filter C^ is maximized) according to the propagation distance L and the processing time of the electronic circuit. In other words, the canceling sound estimation signal generation unit 33 sets the first weighting coefficient $\mu_1$ such that the first weighting coefficient $\mu_1$ is maximized at the delay time (the time the absolute value of the amplitude of the impulse response of the secondary path filter C^ becomes maximum) of the impulse response of the secondary path filter C^ according to the propagation distance L and the processing time of the electronic circuit.

The canceling sound estimation signal generation unit 33 sets the first weighting coefficient $\mu_1$ such that the first weighting coefficient $\mu_1$ decreases stepwise as the sample number increases from the sample number D1. That is, the canceling sound estimation signal generation unit 33 sets the first weighting coefficient $\mu_1$ such that the first weighting coefficient $\mu_1$ decreases stepwise as time elapses from the delay time of the impulse response of the secondary path filter C^.

The canceling sound estimation signal generation unit 33 adaptively updates the secondary path filter C^ according to the following formula (15) using the first weighting coefficient $\mu_1$ set in the above manner. Accordingly, the adaptive update amount of the secondary path filter C^ is adjusted using the first weighting coefficient $\mu_1$.

$$\hat{C}(t+1) = \hat{C}(t) + \mu_1 e_v(t) u(t) \tag{15}$$

<The Adaptive Update of the Primary Path Filter P^>

The noise estimation signal generation unit 36, similar to the canceling sound estimation signal generation unit 33, calculates the sample number D1 using the above formula (14). The noise estimation signal generation unit 36 sets a second weighting coefficient $\mu_2$ such that the second weighting coefficient $\mu_2$ is maximized at the sample number D1 and decreases stepwise as the sample number increases from the sample number D1. That is, the noise estimation signal generation unit 36 sets the second weighting coefficient $\mu_2$ such that the second weighting coefficient $\mu_2$ is maximized at the delay time of the impulse response of the primary path filter P^ and decreases stepwise as time elapses from the delay time of the impulse response of the primary path filter P^.

The noise estimation signal generation unit 36 adaptively updates the primary path filter P^ according to the following formula (16) using the second weighting coefficient $\mu_2$ set in the above manner. Accordingly, the adaptive update amount of the primary path filter P^ is adjusted using the second weighting coefficient $\mu_2$.

$$\hat{P}(t+1) = \hat{P}(t) + \mu_2 e_v(t) r(t) \tag{16}$$

<The Adaptive Update of the Control Filter W>

Figure 6:
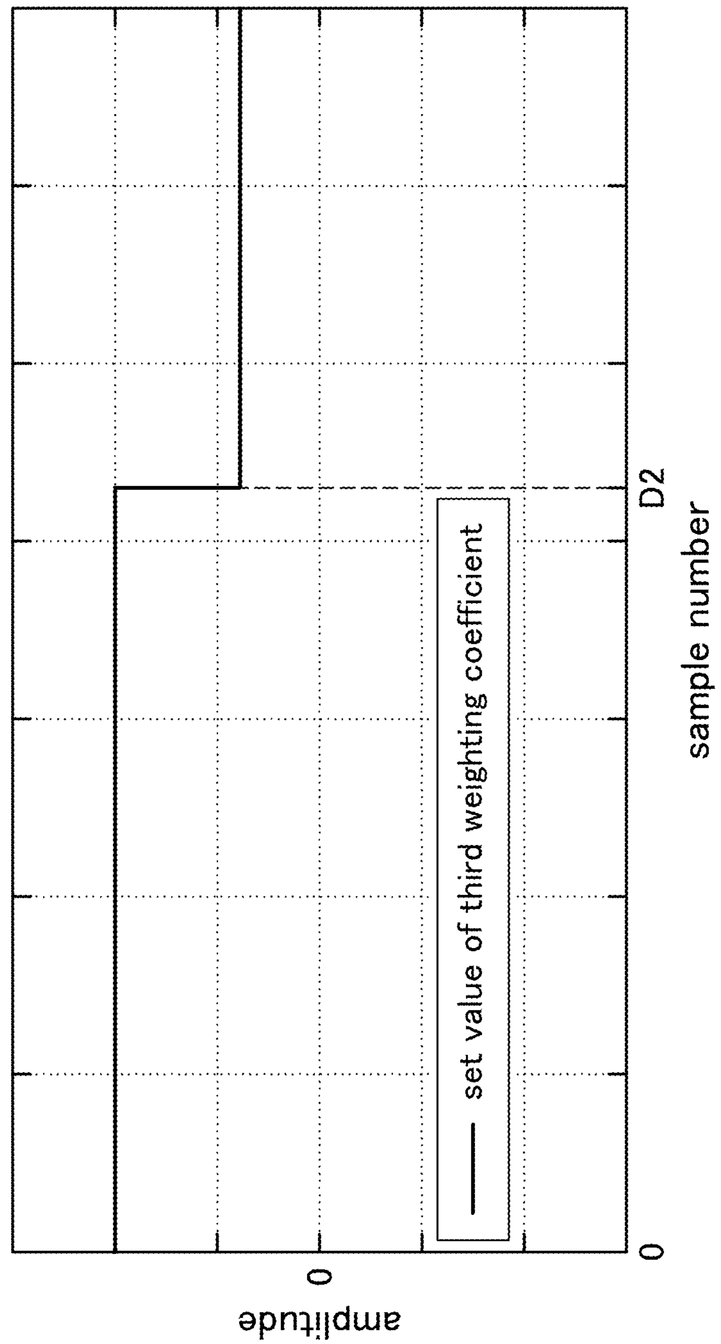
FIG. 6 is a graph showing a set value of a third weighting coefficient according to the second embodiment.

With reference to FIG. 6, the control signal generation unit 32 sets a third weighting coefficient $\mu_3$ such that the third weighting coefficient $\mu_3$ is maximized at the sample number 0. That is, the control signal generation unit 32 sets the third weighting coefficient $\mu_3$ such that the third weighting coefficient $\mu_3$ is maximized at the time the speaker 21 outputs the canceling sound y.

The control signal generation unit 32 sets the third weighting coefficient $\mu_3$ such that the third weighting coefficient $\mu_3$ decreases in a stepped shape at a prescribed sample number D2. That is, the control signal generation unit 32 sets the third weighting coefficient $\mu_3$ such that the third weighting coefficient $\mu_3$ decreases in a stepped shape after a prescribed time elapses from the time the speaker 21 outputs the canceling sound y.

The control signal generation unit 32 adaptively updates the control filter W according to the following formula (17) using the third weighting coefficient $\mu_3$ set in the above manner. Accordingly, the adaptive update amount of the control filter W is adjusted using the third weighting coefficient $\mu_3$.

$$W(t+1) = W(t) - \mu_3 e_b(t)\left(r(t) * \hat{C}(t)\right) \tag{17}$$

<Effects>

The controller 23 adjusts the adaptive update amount of the secondary path filter C^ using the first weighting coefficient $\mu_1$ that corresponds to the characteristic of the impulse response of the secondary path filter C^, and adjusts the adaptive update amount of the primary path filter P^ using the second weighting coefficient $\mu_2$ that corresponds to the characteristic of the impulse response of the primary path filter P^. According to such a configuration, it is possible to cause the secondary path filter C^ and the primary path filter P^ to converge quickly.

Further, the controller 23 adjusts the adaptive update amount of the control filter W using the third weighting coefficient $\mu_3$ that decreases in a stepped shape after a prescribed time elapses from the time the speaker 21 outputs the canceling sound y. According to such a configuration, it is possible to adjust the adaptive update amount of the control filter W—it is difficult to predict the shape of the impulse response thereof—using the third weighting coefficient $\mu_3$ having a simple form.

<Modifications>

In the above second embodiment, the controller 23 sets the first weighting coefficient $\mu_1$ such that the first weighting coefficient $\mu_1$ is maximized at the delay time of the impulse response of the secondary path filter C^ according to the propagation distance L and the processing time of the electronic circuit. In another embodiment, the controller 23 may set the first weighting coefficient $\mu_1$ such that the first weighting coefficient $\mu_1$ is maximized at the delay time of the impulse response of the secondary path filter C^ according to only the propagation distance L. That is, the controller 23 may set the delay time of the impulse response of the secondary path filter C^ based on only the propagation distance L or based on both the propagation distance L and the processing time of the electronic circuit.

In the above second embodiment, the controller 23 sets the time (the time corresponding to the sample number D1 in FIG. 5) the absolute value of the amplitude of the impulse response of the secondary path filter C^ is maximized as the delay time of the impulse response of the secondary path filter C^, and sets the first weighting coefficient $\mu_1$ such that the first weighting coefficient $\mu_1$ is maximized at the delay time. In another embodiment, the controller 23 may set the time (the time corresponding to the sample number D1' in FIG. 5) the absolute value of the amplitude of the direct wave (first wave) in the impulse response of the secondary path filter C^ is maximized as the delay time of the impulse response of the secondary path filter C^, and set the first weighting coefficient $\mu_1$ such that the first weighting coefficient $\mu_1$ is maximized at the delay time.

In the above second embodiment, the controller 23 adjusts the adaptive update amount of the secondary path filter C^ using the first weighting coefficient $\mu_1$ that corresponds to the characteristic of the impulse response of the secondary path filter C^, and adjusts the adaptive update amount of the primary path filter P^ using the second weighting coefficient $\mu_2$ that corresponds to the characteristic of the impulse response of the primary path filter P^. In another embodiment, the controller 23 may apply the above-described method for adjusting the adaptive update amount to only one of the secondary path filter C^ and the primary path filter P^.

In the above second embodiment, the controller 23 decreases the first weighting coefficient $\mu_1$ and the second weighting coefficient $\mu_2$ stepwise. In another embodiment, the controller 23 may decrease the first weighting coefficient $\mu_1$ and the second weighting coefficient $\mu_2$ exponentially or linearly.

The Third Embodiment

Figure 7:
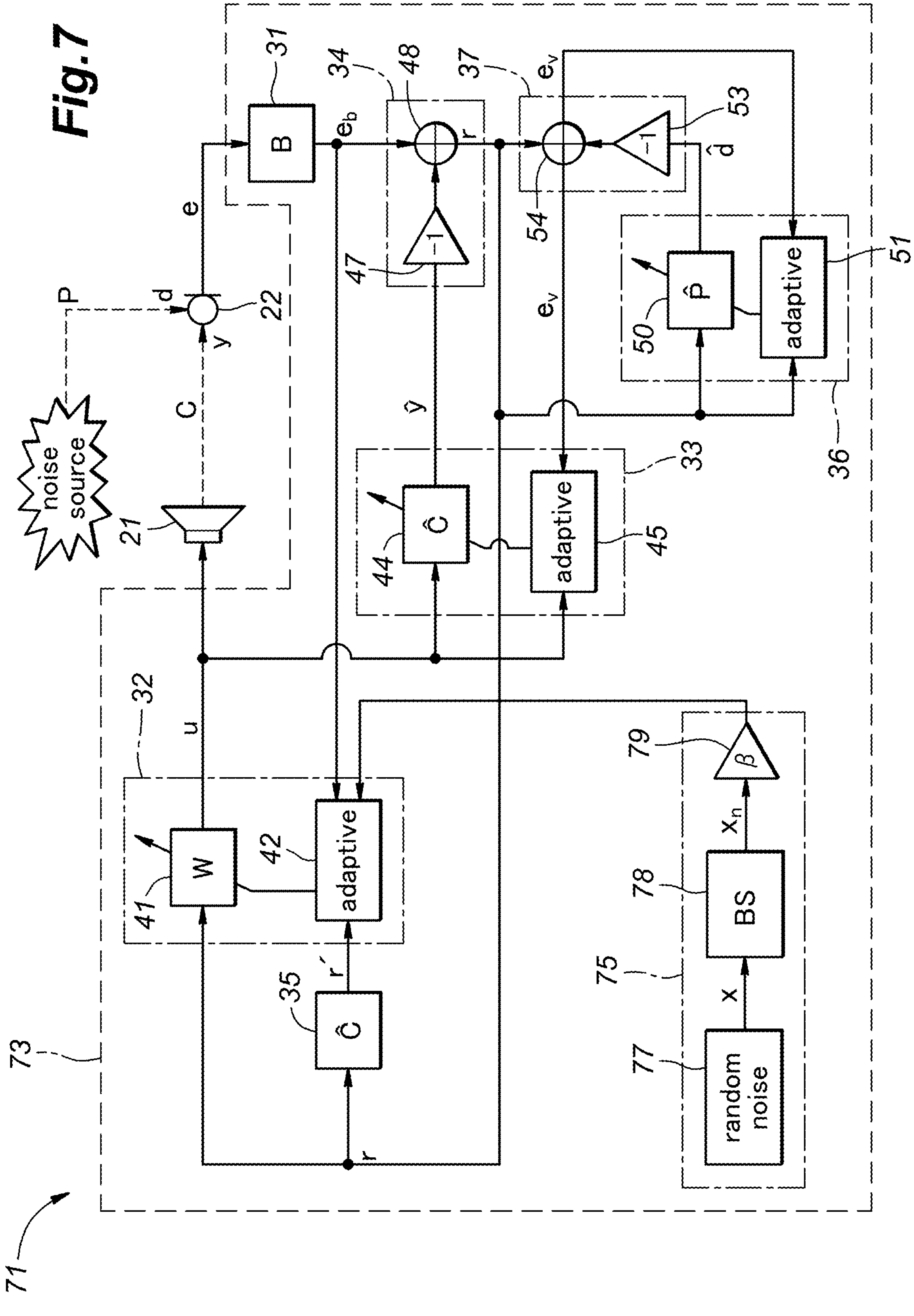
FIG. 7 is a functional block diagram showing an active noise reduction system according to the third embodiment.

Next, with reference to FIG. 7, an active noise reduction system 71 (hereinafter referred to as "the noise reduction system 71") according to the third embodiment of the present invention will be described. The components other than a noise signal generation unit 75 of a controller 73 are the same as those in the first embodiment. Accordingly, the same reference numerals as in the first embodiment are given to these components in the drawings, and the descriptions thereof will be omitted.

<Noise Signal Generation Unit 75>

The noise signal generation unit 75 of the controller 73 includes a noise generation unit 77, a filter unit 78, and a magnitude adjustment unit 79.

The noise generation unit 77 generates a random noise x. The noise generation unit 77 outputs the generated random noise x to the filter unit 78.

The filter unit 78 includes a band-stop filter BS. The band-stop filter BS is a filter that attenuates a component in the control target frequency band (the frequency band to be a control target of the controller 73) of an input signal.

As the band-stop filter BS of the filter unit 78 attenuates a component in the control target frequency band of the random noise x, the filter unit 78 generates a noise signal $x_n$. The filter unit 78 outputs the generated noise signal $x_n$ to the magnitude adjustment unit 79.

The magnitude adjustment unit 79 has a magnitude adjustment coefficient $\beta$. The magnitude adjustment unit 79 adjusts the magnitude of the noise signal $x_n$ by multiplying the noise signal $x_n$ output from the filter unit 78 by the magnitude adjustment coefficient $\beta$. The magnitude adjustment unit 79 outputs the noise signal $x_n$ the magnitude of which is adjusted to the control signal generation unit 32.

<The Adaptive Update of the Control Filter W>

The control signal generation unit 32 adaptively updates the control filter W based on the extraction error signal $e_b$ output from the extraction error signal generation unit 31, the correction reference signal r' (the signal the secondary path filter C^ generates from the reference signal r) output from the reference signal correction unit 35, and the noise signal $x_n$ output from the noise signal generation unit 75. For example, the control signal generation unit 32 adaptively updates the control filter W according to the following formula (18).

$$W(t+1) = W(t) - \mu_3 e_b(t)\left(r(t) * \hat{C}(t)\right) + \beta x_n(t) * (W(t) \cdot x_n(t)) \quad (18)$$

<Effects>

The control signal generation unit 32 generates a virtual error signal e' according to the following formula (19). In the following formula (19), "·" represents an inner product operation, and "$W \cdot x_n$" represents a noise signal $x_n$ (hereinafter referred to as "the correlation noise signal $W \cdot x_n$") that correlates only with the control filter W.

$$e' = d + y + W \cdot x_n \quad (19)$$

The control signal generation unit 32 adaptively updates the control filter W such that the square of the virtual error signal e' is minimized. In order to minimize the square of the virtual error signal e', the actual sound pressure d+y (the sum of the noise d and the canceling sound y) and the correlation noise signal $W \cdot x_n$ need to be minimized. The noise signal $x_n$ is a signal that is in a frequency band other than the control target frequency band and does not correlate with the noise d generated in the vehicle cabin 4. Accordingly, in order to minimize the correlation noise signal $W \cdot x_n$, the control signal generation unit 32 decreases the value of the control filter W in the frequency band other than the control target frequency band. Accordingly, it is possible to suppress an increase in the noise d.

<Modifications>

In the above first to fifth embodiments, the noise reduction system 1 and 71 is applied to the vehicle cabin 4 of the vehicle 3. In another embodiment, the noise reduction system 1 and 71 may be applied to an interior space of a moving body (for example, a ship or an aircraft) other than the vehicle 3, or to an interior space of a fixed object (for example, a house).

Concrete embodiments of the present invention have been described in the foregoing, but the present invention should not be limited by the foregoing embodiments and various modifications and alterations are possible within the scope of the present invention.

The invention claimed is:

1. An active noise reduction system of an IMC type, comprising:

a canceling sound output device configured to output a canceling sound for canceling a noise;

an error microphone configured to generate an error signal based on the noise and the canceling sound; and a controller configured to control the canceling sound output device based on the error signal, wherein the controller includes:

a control filter configured to generate a control signal for controlling the canceling sound output device; and a secondary path filter that represents an estimation value of a transfer function from the canceling sound output device to the error microphone, the secondary path filter is configured to generate a canceling sound estimation signal based on the control signal, the control filter is configured to generate the control signal based on a reference signal generated based on both the error signal and the canceling sound estimation signal, the controller further includes a primary path filter that represents an estimation value of a transfer function from a noise source to the error microphone, the primary path filter is configured to generate a noise estimation signal based on the reference signal, and the secondary path filter and the primary path filter are configured to be adaptively updated based on a virtual error signal generated based on both the reference signal and the noise estimation signal.

2. The active noise reduction system according to claim 1, wherein the controller is configured to normalize an adaptive update amount of the secondary path filter and an adaptive update amount of the primary path filter using a common normalization divisor.

3. The active noise reduction system according to claim 2, wherein the secondary path filter is configured to be adaptively updated based on the control signal and the virtual error signal, the primary path filter is configured to be adaptively updated based on the reference signal and the virtual error signal, and the common normalization divisor includes a norm of a signal vector of the reference signal and a norm of a signal vector of the control signal.

4. The active noise reduction system according to claim 1, wherein the secondary path filter is composed of a finite impulse response filter, and the controller is configured to adjust an adaptive update amount of the secondary path filter using a weighting coefficient that corresponds to a characteristic of an impulse response of the secondary path filter.

5. The active noise reduction system according to claim 4, wherein the controller is configured to set the weighting coefficient such that the weighting coefficient is maximized at a delay time of the impulse response of the secondary path filter according to a distance from the canceling sound output device to the error microphone.

6. The active noise reduction system according to claim 5, wherein the controller is configured to set the weighting coefficient such that the weighting coefficient becomes smaller as time elapses from the delay time.

7. The active noise reduction system according to claim 1, wherein the control filter is configured to be adaptively updated based on the error signal, and the controller is configured to adjust an adaptive update amount of the control filter using a weighting coefficient that decreases in a stepped shape after a prescribed time elapses from a time the canceling sound output device outputs the canceling sound.

8. The active noise reduction system according to claim 1, wherein the controller further includes a band-pass filter configured to generate an extraction error signal by extracting a component in a prescribed control target frequency band from the error signal, and the reference signal is configured to be generated based on the extraction error signal and the canceling sound estimation signal.

9. The active noise reduction system according to claim 8, wherein the controller further includes:

a noise generation unit configured to generate a random noise; and a band-stop filter configured to generate a noise signal by attenuating a component in the control target frequency band of the random noise, and the control filter is configured to be adaptively updated based on the extraction error signal and the noise signal.

* * * * *